(12) United States Patent
Dehmer et al.

(10) Patent No.: US 11,022,111 B2
(45) Date of Patent: Jun. 1, 2021

(54) PISTON ASSEMBLY INTERLOCKED WITH PISTON ACTUATOR BEING UNLOCKABLE UPON DISASSEMBLY OF PUMP

(71) Applicant: AGILENT TECHNOLOGIES, INC., Loveland, CO (US)

(72) Inventors: Bernhard Dehmer, Waldbronn (DE); Arne Kurz, Boblingen (DE); Lothar Mitzlaff, Nufringen (DE)

(73) Assignee: Agilent Technologies, Inc., Santa Clara, CA (US)

( * ) Notice: Subject to any disclaimer, the term of this patent is extended or adjusted under 35 U.S.C. 154(b) by 578 days.

(21) Appl. No.: 14/633,281

(22) Filed: Feb. 27, 2015

(65) Prior Publication Data
US 2015/0240804 A1    Aug. 27, 2015

(30) Foreign Application Priority Data

Feb. 27, 2014    (GB) .................................... 1403482

(51) Int. Cl.
| | |
|---|---|
| *F04B 53/22* | (2006.01) |
| *F04B 19/22* | (2006.01) |
| *F04B 37/00* | (2006.01) |
| *F04B 39/14* | (2006.01) |
| *F04B 53/14* | (2006.01) |
| *F04B 53/16* | (2006.01) |
| *B01D 15/14* | (2006.01) |

(Continued)

(52) U.S. Cl.
CPC .............. *F04B 53/22* (2013.01); *B01D 15/14* (2013.01); *B01D 19/0068* (2013.01); *F04B 17/03* (2013.01); *F04B 19/22* (2013.01); *F04B 37/00* (2013.01); *F04B 39/14* (2013.01); *F04B 53/14* (2013.01); *F04B 53/16* (2013.01)

(58) Field of Classification Search
None
See application file for complete search history.

(56) References Cited

U.S. PATENT DOCUMENTS

| | | | |
|---|---|---|---|
| 2,928,390 | A | 3/1960 | Venditty et al. |
| 4,982,597 | A | 1/1991 | Berger |
| 5,788,465 | A | 8/1998 | Luang et al. |

FOREIGN PATENT DOCUMENTS

| | | |
|---|---|---|
| EP | 0833055 A2 | 4/1998 |
| WO | WO9731191 | 8/1997 |
| WO | 2014100658 A1 | 6/2014 |

OTHER PUBLICATIONS

A. G. Huesgen, "Fast and Ultra-fast Analysis with the Agilent 1200 Series Rapid Resolution LC System Compared to a Conventional Agilent 1100 Series LC System Using Sub 2-μm Particle Columns", Agilent Technologies, Publication No. 5989-5672EN, Oct. 1, 2006.

(Continued)

*Primary Examiner* — Kara M Peo (57) ABSTRACT

A pump for pumping fluid, wherein the pump comprises a pump head comprising a working chamber, a piston assembly configured for reciprocating within the working chamber to thereby displace fluid, a pump base accommodating a piston actuator being mechanically lockable to the piston assembly in a working mode of the pump to thereby transmit drive energy to the piston assembly to reciprocate, and a locking/unlocking mechanism configured to, upon unfastening the pump head from the pump base, mechanically unlock the piston actuator from the piston assembly in a maintenance mode of the pump.

20 Claims, 2 Drawing Sheets

(51) Int. Cl.
*B01D 19/00* (2006.01)
*F04B 17/03* (2006.01)

(56) References Cited

OTHER PUBLICATIONS

Agilent Technologies, "Agilent 1290 Infinity LC", Publication No. 5990-3670EN, Nov. 1, 2009.
Agilent Technologies, "Agilent 1100 Series Well-Plate LC System: a complete solution to speed sample throughput", Publication No. 5968-9584E, 2000.
Search Report dated Oct. 7, 2014 in Uk Application No. GB1403482. 1.

Fig. 3

PISTON ASSEMBLY INTERLOCKED WITH PISTON ACTUATOR BEING UNLOCKABLE UPON DISASSEMBLY OF PUMP

BACKGROUND ART

The present application claims priority under 35 U.S.C. § 119(e) from United Kingdom Patent Application No. 1403482.1 filed on Feb. 27, 2014 naming Bernhard Dehmer, et al. as inventors. The entire disclosure of United Kingdom Patent Application No. 1403482.1 is specifically incorporated herein by reference.

The present invention relates to a pump for pumping fluid, to a fluid separation apparatus, and to a method of operating a pump.

In a sample separation device based on the principle of liquid chromatography, a fluidic sample to be separated is injected in a mobile phase (such as a solvent composition), wherein the mixture may be pumped through conduits and a column comprising a material (stationary phase) which is capable of separating different components of the fluidic sample. Such a material, so-called beads which may comprise silica gel, may be filled into a column tube which may be connected to other elements (like a sampling unit, a flow cell, containers including sample and/or buffers) by conduits.

For pumping a fluid constituted by the mobile phase and the fluidic sample to be separated to the sample separation device, a pump may be implemented in which a piston reciprocates within a pumping chamber to thereby displace the fluid.

U.S. Pat. No. 5,788,465 discloses a pump configured so that tools are not required to remove the pump head and disassemble the plunger. A single large hand operated knob or head nut facilitates tool-less pump head removal. The pump head is guided into position in a manifold and held in place by the hand knob. The manifold is designed to receive all the external fluidic connections made to the pump head. Fluid paths to the pump head have been replaced with miniature face seals which facilitate high pressure sealing between the pump head and manifold. Low pressure tubing seals reside in a seal wash chamber or housing and are not attached to the head, eliminating the need for tooling to disconnect them during pump head removal. A tool-less plunger mechanism includes a nutcap assembly having a plunger socket receiving a plunger assembly including a sapphire plunger fixed to a plunger holder ball accommodated by the socket. The plunger assembly is captured within the socket by a plurality of cams. The cams are spring loaded to rotate and collapse onto the plunger holder ball, pulling the plunger assembly tightly into the socket. A restricting cone is actuated to rotate the cams away from the plunger holder ball for release and removal of the plunger assembly.

Conventional pumps either have a complex coupling mechanism between piston and a piston driving member or are cumbersome in maintenance. This causes problems for instance in a scenario in which a worn out piston shall be repaired or substituted by a new one.

DISCLOSURE

It is an object of the invention to provide a compact pump being user-convenient in maintenance.

According to an exemplary embodiment of the present invention, a pump for pumping fluid is provided, wherein the pump comprises a pump head comprising a working chamber, a piston assembly configured for reciprocating within the working chamber to thereby displace fluid (such as a liquid and/or a gas, optionally comprising solid particles), a pump base accommodating a piston actuator being mechanically lockable to the piston assembly in a working mode (i.e. an operation mode of the pump in which the pump is ready to displace fluid) of the pump to thereby when the piston actuator moves, particularly reciprocates—transmit drive energy to the piston assembly to reciprocate the piston assembly, and a locking/unlocking mechanism configured to, upon (in particular triggered by) unfastening the pump head from the pump base, mechanically unlock the piston actuator from the piston assembly in a maintenance mode of the pump (i.e. an operation mode of the pump in which the pump is ready for maintenance, in particular for maintenance, repair or substitution of the piston assembly or part thereof).

According to another exemplary embodiment, a fluid separation apparatus for separating a fluidic sample into a plurality of fractions is provided, wherein the apparatus comprises a pump having the above-mentioned features and being configured for driving a fluid comprising a mobile phase and the fluidic sample in the mobile phase along a fluidic path, and a separation unit arranged within the fluidic path and configured for separating the fluidic sample into the plurality of fractions.

According to still another exemplary embodiment, a method of operating a pump selectively in a working mode for pumping fluid or in a maintenance mode for maintenance of the pump is provided, wherein the method comprises activating the working mode by fastening a pump head to a pump base (for instance by a fastener) so that in a subsequent transmission of drive energy (which may be provided by a drive unit of the pump such as an electric motor) from a piston actuator to a piston assembly to force the piston assembly to reciprocate within a working chamber to displace fluid, the piston actuator accommodated in the pump base is mechanically locked to the piston assembly, and activating the maintenance mode by unfastening the pump head from the pump base (for instance by disassembling the fastener) to thereby simultaneously mechanically unlock the piston actuator from the piston assembly.

According to an exemplary embodiment, a pump is provided which is capable of pumping fluid with a high pressure in a reliable way when a pump head and a pump base are locked together in a working mode of the pump. A piston assembly in the pump head is then drivably coupled or driven by a piston actuator, which is, in turn, movable or moved by a drive unit such as a motor. In order to get access to an interior of the pump (for instance for maintenance purposes), it is sufficient to separate pump head and pump base from one another. Due to a locking/unlocking mechanism operating for functionally intermediating between piston actuator and piston assembly, the separation of the pump head from the pump base will automatically result in a mechanical release or isolation of the previously locked piston assembly, which can then be removed out of the pump, in particularly out of the pump head. This removal procedure may be preferably achieved without using any further tools, i.e. completely manually and without the need to manually release or disassemble the piston assembly from the disassembled pump head. In other words, a user only has to separate the pump head from the pump base, and will thereby simultaneously free the piston assembly from the pump for ease of maintenance. Thus, a single user operation (for instance actuating a fastener) may be sufficient for obtaining both disassembly of pump head from pump base and disassembly of piston actuator from the rest of the pump. Configuring piston assembly and piston actuator as interlockable in the working mode allows for a compact and simple construction of the piston-actuator assembly.

In the following, further embodiments of the pump, the fluid separation apparatus and the method will be explained.

In an embodiment, the pump comprises an optional fastener being actuable (for example by a user, for instance using a tool) for fastening the pump head to the pump base for the working mode of the pump or for unfastening the pump head from the pump base for the maintenance mode of the pump. This fastener may be configured to be actuated by a user to activate either the working mode or the maintenance mode.

In an embodiment, the locking/unlocking mechanism is configured to, upon fastening the pump head to the pump base by actuating the fastener (optionally in combination with an activation of the supply of the pump with drive energy), mechanically lock the piston actuator to the piston assembly when transferring the pump from the maintenance mode into the working mode. The locking procedure may optionally be supported or completed by a drive unit providing drive energy for driving the piston actuator and indirectly the piston assembly, wherein this motion of the piston actuator completes the locking procedure. Alternatively, the fastening alone may complete the locking. The mechanical mechanism of assembling the pump for establishing a locking between piston actuator and piston assembly may be designed to be inverse to the mechanism of disassembling the pump while simultaneously unlocking piston actuator from piston assembly. This is very convenient for a user of the pump who only needs to operate the fastener (and optionally start the pump) and will thereby also be able to initiate the locking of the piston assembly to the piston actuator by fastening the pump head to the pump base via the fastener. Thus, also the assembly procedure is very simple for a user.

In other words, the locking in the working mode may be completed in one embodiment merely by fastening the pump head to the pump base by the fastener (which also results in the locking without taking further measures). In another embodiment, the locking in the working mode may be completed by fastening the pump head to the pump base by the fastener in combination with the subsequent transmission of drive energy from the piston actuator to the piston assembly (for example, an axial displacement of the piston actuator may be necessary after the mounting procedure to finish the procedure).

In an embodiment, the locking/unlocking mechanism is configured so that, when the piston actuator is mechanically locked to the piston assembly in the working mode of the pump, the piston actuator is rigidly assembled with the piston assembly so that the piston-actuator-assembly (i.e. an arrangement constituted by the piston assembly and the piston actuator) is arranged to commonly reciprocate along a common rigid axis. In other words, the piston actuator and the piston assembly when being locked to one another may form a common rigid member reciprocating together along the piston-actuator axis. This also relaxes the requirements in terms of needed bearings for bearing the piston actuator and the piston assembly, since the rigid common coupling renders it sufficient to use a single bearing for bearing the piston actuator and a single limited bearing volume for bearing the piston assembly. By such a configuration, the common piston-actuator-assembly is then capable of performing a pendulum-like equilibration motion around a bearing point within the limited bearing volume. In other words, the piston-actuator assembly may be free of a hinge joint between piston actuator and piston assembly in the described embodiment and therefore inhibits relative motions between piston actuator and piston assembly in the working mode.

In an embodiment, the locking/unlocking mechanism is configured so that, upon unfastening the pump head from the pump base by actuating the fastener, the piston assembly is released (in particular decoupled or isolated) from the rest of the pump so as to be manually removable out of the pump head, in particular without using a tool. When the user has actuated the fastener and has thereby separated the pump head from the pump base, the user may simply take out the piston assembly from the pump head, because the unfastening operation has also unlocked the piston assembly from the piston actuator.

A working stroke of the piston assembly corresponds to an axial distance over which the piston assembly moves when displacing fluid. In an embodiment, the piston assembly is moved to a rear back position (i.e. to a position of the piston assembly with a maximum distance to the front face of the working chamber in the pump head) for activating the maintenance mode (because in an embodiment, the locking/unlocking mechanism can only initiate unlocking in this position). Advantageously, no additional stroke contribution in addition to the working stroke is necessary in embodiments of the invention to realize the automatic unlocking. In other words, no additional motion pattern is required in addition to the working stroke for the maintenance mode so that an anyway necessary motion can be used for the automatic unlocking. This has the desired effect that the axial length of the piston-actuator-assembly (in particular the piston actuator which may be configured as a spindle or mandrel) remains relatively short, which, in turn, results in a compact pump.

In an embodiment, the locking/unlocking mechanism is configured so that upon unfastening the pump head from the pump base by actuating the fastener, a (previously biased) biasing element expands or is relieved to thereby exert an unlocking force forcing the piston actuator to be unlocked from the piston assembly. In an embodiment, the biasing element may be a spring. In particular, a helical spring having a spring axis parallel to a common axis of the piston actuator and the piston assembly when being locked to one another is advantageous, since this allows to compactly arrange the spring around the piston-actuator-assembly. In another embodiment, the biasing element may be realized by a magnetic mechanism. Such biasing elements provide the mechanical or kinetic energy for unlocking the piston actuator from the piston assembly when removing the pump head from the pump base. The biasing element may support a user separating the pump head from the pump base in increasing the distance between pump head and pump base upon disassembly which may trigger the unlocking operation of the locking/unlocking mechanism.

In an embodiment, the (for instance previously unbiased) biasing element is configured to be biased upon fastening the pump head to the pump base by actuating the fastener. The biasing element may be arranged in the pump in such a way that it is biased (for instance a spring is compressed) when the user connects the pump head to the pump base by a fastening actuation of the fastener. Correspondingly, the same biasing element may expand or relax when the user disconnects the pump head from the pump base by an unfastening actuation of the fastener.

In an embodiment, the biasing element is configured to move a (particularly linearly) movable member of the pump base when expanding so that the moving movable member actuates a lever member (which may be a lever mechanism) coupling the piston actuator to the piston assembly to thereby pivot the lever member which unlocks the piston actuator from the piston assembly. When the user operates the fastener and separates the pump head from the pump base, the biasing element may expand, thereby converting potential energy stored in the biased biasing element into kinetic energy moving the movable member. The lever member may be mounted in a pivotable or rotatable manner on the piston actuator. In an embodiment, the movable member may be a rigid hollow substantially tubular shaped body (for instance having a rotationally symmetric shape) enclosing at least part of the piston-actuator-assembly and being axially displaceable by the biasing element. In particular, one flange end of the movable member may be actuable by the expanding elastic element. An opposing other flange end of the movable member may have a hook section which may operate on a corresponding hook section of the lever member so as to convert an axial motion of the biasing element and an axial motion of the movable member into a rotational motion of the lever member. When an opposing other hook section of the rigid but pivotably mounted lever member is also rotated, it may be disengaged from a recess or undercut of the piston assembly to thereby release the piston assembly from the piston actuator.

In an embodiment, the locking/unlocking mechanism is configured so that upon unfastening the pump head from the pump base by actuating the fastener, an engagement section of the locking/unlocking mechanism engaging an engagement section of the piston assembly is disengaged to thereby unlock the piston actuator from the piston assembly. More particularly, the engagement section of the locking/unlocking mechanism may form part of the above mentioned lever member engaging an undercut as the engagement section of the piston assembly, wherein the lever member is arranged to pivot upon unfastening the pump head from the pump base by actuating the fastener. In particular, the lever member may be mounted pivotably on the piston actuator.

In an embodiment, the lever member or lever mechanism comprises at least two separate levers arranged to circumferentially surround the piston assembly in the working mode of the pump. Alternatively, it is possible that the lever member comprises only a single lever. However, when providing two levers, or even three or more levers distributed preferably homogeneously around the perimeter of the piston assembly and/or piston actuator, the force distribution around the piston-actuator-assembly by the locking/unlocking procedure is more homogeneous, further reducing any remaining impact on the undisturbed reciprocation of the piston member in the working chamber during displacing the fluid.

In an embodiment, the pump base comprises at least one pre-positioning socket configured for being insertable in at least one corresponding socket reception of the pump head so as to pre-position the piston assembly within the pump prior to the fastening (in an alternative embodiment, the pump head comprises at least one pre-positioning socket configured for being insertable in at least one corresponding socket reception of the pump base so as to pre-position the piston assembly within to the pump prior to the fastening). Thus, when attaching the pump head to the pump base before actually actuating the fastener, the pre-positioning socket in combination with the socket reception intuitively enables a user to roughly estimate a correct orientation of the pump head with respect to the pump base. Providing more than one socket and more than one socket reception advantageously renders an incorrect orientation of pump head with regard to pump base impossible.

In an embodiment, the at least one pre-positioning socket comprises a fastener reception configured for receiving the fastener to thereby fasten the pump head to the pump base. Thus, the pre-positioning socket may be synergetically used for two purposes, i.e. rough pre-positioning and also as a member contributing to the actual fastening procedure. For instance, the fastener reception may be provided with an internal or interior thread when the fastener comprises one or more screws with a corresponding external or exterior thread.

In an embodiment, the piston assembly, the piston actuator and the locking/unlocking mechanism are matched so that, for activating the working mode, the piston assembly is only loosely insertable into the working chamber and is only later fine positioned and locked to the piston actuator via the locking/unlocking mechanism by fastening the pump head to the pump base by actuating the fastener. Optionally, the locking is completed by the provision of drive energy to the piston actuator by a drive unit (such as an electric motor) of the pump. It is hence sufficient that a user inserts the piston assembly into the working chamber of the pump head in a roughly correct way, in particular making sure that the piston is properly surrounded by a sealing. After that, a rough pre-positioning may be achieved by attaching the pump head to the pump base, optionally making use of the above-mentioned pre-positioning sockets and assigned socket receptions. The correct fine orientation between the piston actuator and the piston assembly is then achieved merely by connecting the pump head to the pump base by the fastener and by then starting the pump, wherein the locking mechanism automatically ensures a correct orientation of the members with respect to one another. This is very convenient for a user.

In an embodiment, the piston actuator forms part of a ball screw. A ball screw can be a mechanism of converting rotational drive energy into a longitudinal motion. A motor or another drive unit usually rotates a shaft, i.e. provides rotational drive energy. A combination of a nut and a corresponding mandrel (or screw) on which the nut is mounted may form the above-mentioned ball screw. In one embodiment, the drive unit drives the nut to perform a rotational motion, which results in a longitudinal or axial motion of the mandrel. The mandrel then constitutes the piston actuator. In another embodiment, the drive unit drives the mandrel to perform a rotational motion, which results in a longitudinal or axial motion of the nut. The nut then constitutes the piston actuator.

In an embodiment, the piston assembly comprises a piston and a piston base at which the piston is (detachably or fixedly) mounted, wherein the piston forms a free front section of the piston assembly displacing the fluid and the piston base forms a rear section of the piston assembly lockable to the piston actuator. The piston may be a cylindrical member having a front face actually displacing the fluid and having a lateral surface sliding along the working chamber sealed by a sealing. The piston base or piston foot comprises a recess or accommodation volume for accommodating an end of the piston and comprises another section cooperating with the piston actuator and with the locking/unlocking mechanism.

In an embodiment, the piston assembly and the piston actuator are configured so that a mutual coupling surface between the piston assembly and the piston actuator in their locked configuration has an annular shape. The central opening of the annular coupling surface may be protruded by an end section of the piston assembly. Arranging the coupling surface in an annular way and therefore with a relatively large radius renders the piston-actuator-assembly tolerant against spatial distortions.

In an embodiment, the fastener (which may also be denoted as a fastener mechanism) may comprise at least one of:

- a screw fastener (which may be constituted by one or more screws, in particular operated by a screwdriver or another tool) for fastening the pump head to the pump base by screwing the screw fastener through the pump head and the pump base,
- a clamp lever member for fastening the pump head to the pump base by moving the clamp lever member to thereby clamp the pump head to the pump base;
- a screwed joint for fastening the pump head to the pump base by screwing the pump head and the pump base together; and/or
- a bayonet joint for fastening the pump head to the pump base by forming a bayonet connection between the pump head and the pump base.

However, other configurations of the fastener are possible as well.

In an embodiment, the pump comprises a drive unit accommodated by the pump base for generating the drive energy for driving the piston actuator and, in turn, the piston assembly. For instance, such a drive unit may be an electric engine having a rotating shaft transferring kinetic energy to the piston actuator.

In an embodiment, the pump is configured for pumping the fluid with a pressure of at least approximately 500 bar, in particular at least approximately 1000 bar, more particularly at least approximately 1500 bar. Particularly with such high pressure values, a robust and rigidly coupled piston-actuator-assembly is of upmost advantage, since it provides sufficient mechanical stability and is, particularly with the pendulum like bearing arrangement, nevertheless capable of performing slight spatial equilibration motions.

The separation unit may be filled with a separating material. Such a separating material which may also be denoted as a stationary phase may be any material which allows an adjustable degree of interaction with a sample fluid so as to be capable of separating different components of such a sample fluid. The separating material may be a liquid chromatography column filling material or packing material comprising at least one of the group consisting of polystyrene, zeolite, polyvinylalcohol, polytetrafluorethylene, glass, polymeric powder, silicon dioxide, and silica gel, or any of above with chemically modified (coated, capped etc) surface. However, any packing material can be used which has material properties allowing an analyte passing through this material to be separated into different components, for instance due to different kinds of interactions or affinities between the packing material and fractions of the analyte.

At least a part of the separation unit may be filled with a fluid separating material, wherein the fluid separating material may comprise beads having a size in the range of essentially 1 µm to essentially 50 µm. Thus, these beads may be small particles which may be filled inside the separation section of the microfluidic device. The beads may have pores having a size in the range of essentially 0.01 µm to essentially 0.2 µm. The fluidic sample may be passed through the pores, wherein an interaction may occur between the fluidic sample and the pores.

The separation unit may be a chromatographic column for separating components of the fluidic sample. Therefore, exemplary embodiments may be particularly implemented in the context of a liquid chromatography apparatus.

The fluid separation apparatus may be configured to conduct a liquid mobile phase through the separation unit. As an alternative to a liquid mobile phase, a gaseous mobile phase or a mobile phase including solid particles may be processed using the fluid separation apparatus. Also materials being mixtures of different phases (solid, liquid, gaseous) may be processed using exemplary embodiments. The fluid separation apparatus may be configured to conduct the mobile phase through the system with a high pressure, particularly of at least 600 bar, more particularly of at least 1200 bar.

The fluid separation apparatus may be configured as a microfluidic device. The term "microfluidic device" may particularly denote a fluid separation apparatus as described herein which allows to convey fluid through microchannels having a dimension in the order of magnitude of less than 500 µm, particularly less than 200 µm, more particularly less than 100 µm or less than 50 µm or less.

Exemplary embodiments may be implemented in a sample injector of a liquid chromatography apparatus which sample injector may take up a sample fluid from a fluid container and may inject such a sample fluid in a conduit for supply to a separation column. During this procedure, the sample fluid may be compressed from, for instance, normal pressure to a higher pressure of, for instance several hundred bars or even 1000 bar and more. An autosampler may automatically inject a sample fluid from the vial into a sample loop (alternatively, a fixed loop concept may be applied). A tip or needle of the autosampler may dip into a fluid container, may suck fluid into the capillary and may then drive back into a seat to then, for instance via a switchable fluidic valve, inject the sample fluid towards a sample separation section of the liquid chromatography apparatus.

The fluid separation apparatus may be configured to analyze at least one physical, chemical and/or biological parameter of at least one component of the sample fluid in the mobile phase. The term "physical parameter" may particularly denote a size or a temperature of the fluid. The term "chemical parameter" may particularly denote a concentration of a fraction of the analyte, an affinity parameter, or the like. The term "biological parameter" may particularly denote a concentration of a protein, a gene or the like in a biochemical solution, a biological activity of a component, etc.

The fluid separation apparatus may be implemented in different technical environments, like a sensor device, a test device, a device for chemical, biological and/or pharmaceutical analysis, a capillary electrophoresis device, a liquid chromatography device, a gas chromatography device, an electronic measurement device, or a mass spectroscopy device. Particularly, the fluid separation apparatus may be a High Performance Liquid device (HPLC) device by which different fractions of an analyte may be separated, examined and analyzed.

An embodiment of the present invention comprises a fluid separation apparatus configured for separating compounds of a sample fluid in a mobile phase. The fluid separation apparatus may comprise a mobile phase drive, such as a pumping system, configured to drive the mobile phase through the fluid separation apparatus. A separation unit, which can be a chromatographic column, is provided for separating compounds of the sample fluid in the mobile phase. The fluid separation apparatus may further comprise a sample injector configured to introduce the sample fluid into the mobile phase, a detector configured to detect separated compounds of the sample fluid, a collector configured to collect separated compounds of the sample fluid, a data processing unit configured to process data received from the fluid separation apparatus, and/or a degassing apparatus for degassing the mobile phase.

Embodiments of the present invention might be embodied based on most conventionally available HPLC systems, such as the Agilent 1290 Series Infinity system, Agilent 1200 Series Rapid Resolution LC system, or the Agilent 1100 HPLC series (all provided by the applicant Agilent Technologies—see www.agilent.com—which shall be incorporated herein by reference).

One embodiment comprises a pump having a piston for reciprocation in a pump working chamber to compress liquid in the pump working chamber to a high pressure at which compressibility of the liquid becomes noticeable. One embodiment comprises two pumps coupled either in a serial or parallel manner.

The mobile phase (or eluent) can be either a pure solvent or a mixture of different solvents. It can be chosen e.g. to minimize the retention of the compounds of interest and/or the amount of mobile phase to run the chromatography. The mobile phase can also been chosen so that the different compounds can be separated effectively. The mobile phase might comprise an organic solvent like e.g. methanol or acetonitrile, often diluted with water. For gradient operation water and organic solvent are delivered in separate bottles, from which the gradient pump delivers a programmed blend to the system. Other commonly used solvents may be isopropanol, tetrahydrofuran (THF), hexane, ethanol and/or any combination thereof or any combination of these with aforementioned solvents.

The sample fluid might comprise any type of process liquid, natural sample like juice, body fluids like plasma or it may be the result of a reaction like from a fermentation broth.

The fluid is preferably a liquid but may also be or comprise a gas and/or a supercritical fluid (as e.g. used in supercritical fluid chromatography—SFC—as disclosed e.g. in U.S. Pat. No. 4,982,597 A).

The pressure in the mobile phase might range from 2-200 MPa (20 to 2000 bar), in particular 10-150 MPa (100 to 1500 bar), and more particular 50-120 MPa (500 to 1200 bar).

BRIEF DESCRIPTION OF DRAWINGS

Other objects and many of the attendant advantages of embodiments of the present invention will be readily appreciated and become better understood by reference to the following more detailed description of embodiments in connection with the accompanying drawings. Features that are substantially or functionally equal or similar will be referred to by the same reference signs.

The illustration in the drawing is schematic.

Figure 1:
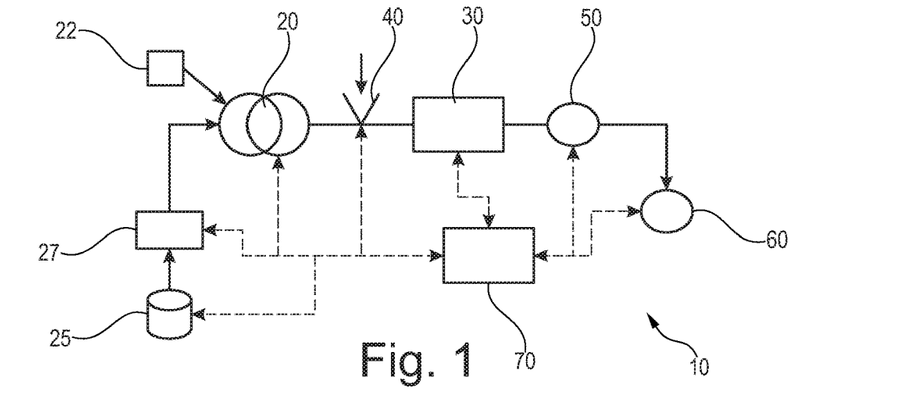
FIG. 1 shows a liquid separation device in accordance with embodiments of the present invention, particularly used in high performance liquid chromatography (HPLC).

Referring now in greater detail to the drawings, FIG. 1 depicts a general schematic of a liquid separation system 10. A pump 20 receives a mobile phase from a solvent supply 25, typically via a degasser 27, which degases and thus reduces the amount of dissolved gases in the mobile phase. The pump 20—as a mobile phase drive—drives the mobile phase through a separating unit 30 (such as a chromatographic column) comprising a stationary phase. A sampling unit 40 can be provided between the pump 20 and the separating unit 30 in order to subject or add (often referred to as sample introduction) a sample fluid into the mobile phase. The stationary phase of the separating unit 30 is configured for separating compounds of the sample liquid. A detector 50 is provided for detecting separated compounds of the sample fluid. A fractionating unit 60 can be provided for outputting separated compounds of sample fluid.

While the mobile phase can be comprised of one solvent only, it may also be mixed from plural solvents. Such mixing might be a low pressure mixing and provided upstream of the pump 20, so that the pump 20 already receives and pumps the mixed solvents as the mobile phase. Alternatively, the pump 20 might be comprised of plural individual pumping units, with plural of the pumping units each receiving and pumping a different solvent or mixture, so that the mixing of the mobile phase (as received by the separating unit 30) occurs at high pressure and downstream of the pump 20 (or as part thereof). The composition (mixture) of the mobile phase may be kept constant over time, the so called isocratic mode, or varied over time, the so called gradient mode.

A data processing unit 70, which can be a conventional PC or workstation, might be coupled (as indicated by the dotted arrows) to one or more of the devices in the liquid separation system 10 in order to receive information and/or control operation. For example, the data processing unit 70 might control operation of the pump 20 (e.g. setting control parameters) and receive therefrom information regarding the actual working conditions (such as output pressure, flow rate, etc. at an outlet of the pump 20). The data processing unit 70 might also control operation of the solvent supply 25 (e.g. setting the solvent/s or solvent mixture to be supplied) and/or the degasser 27 (e.g. setting control parameters such as vacuum level) and might receive therefrom information regarding the actual working conditions (such as solvent composition supplied over time, flow rate, vacuum level, etc.). The data processing unit 70 might further control operation of the sampling unit 40 (e.g. controlling sample injection or synchronization of sample injection with operating conditions of the pump 20). The separating unit 30 might also be controlled by the data processing unit 70 (e.g. selecting a specific flow path or column, setting operation temperature, etc.), and send—in return—information (e.g. operating conditions) to the data processing unit 70. Accordingly, the detector 50 might be controlled by the data processing unit 70 (e.g. with respect to spectral or wavelength settings, setting time constants, start/stop data acquisition), and send information (e.g. about the detected sample compounds) to the data processing unit 70. The data processing unit 70 might also control operation of the fractionating unit 60 (e.g. in conjunction with data received from the detector 50), which provides data back.

Figure 2:
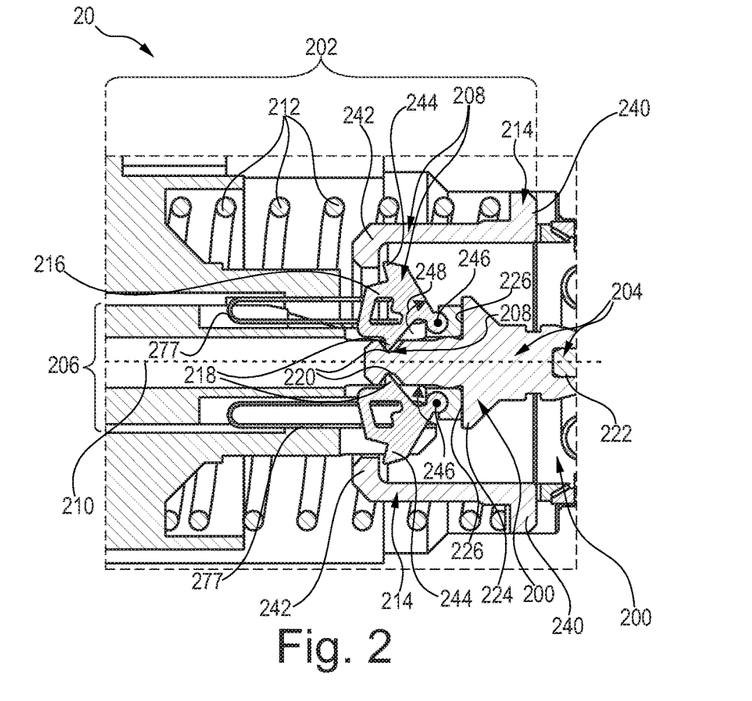
FIG. 2 illustrates a cross-sectional view of a pump according to an exemplary embodiment of the invention in a working mode.

As can be taken from FIG. 1 as well, the pump 20 comprises a drive unit 22 which may be embodied as an electric motor which may be accommodated by a pump base (see reference numeral 202 in FIG. 2) for generating drive energy for driving a piston actuator (see reference numeral 206 in FIG. 2) and, in turn, a piston assembly (see reference numeral 204 in FIG. 2).

Figure 3:
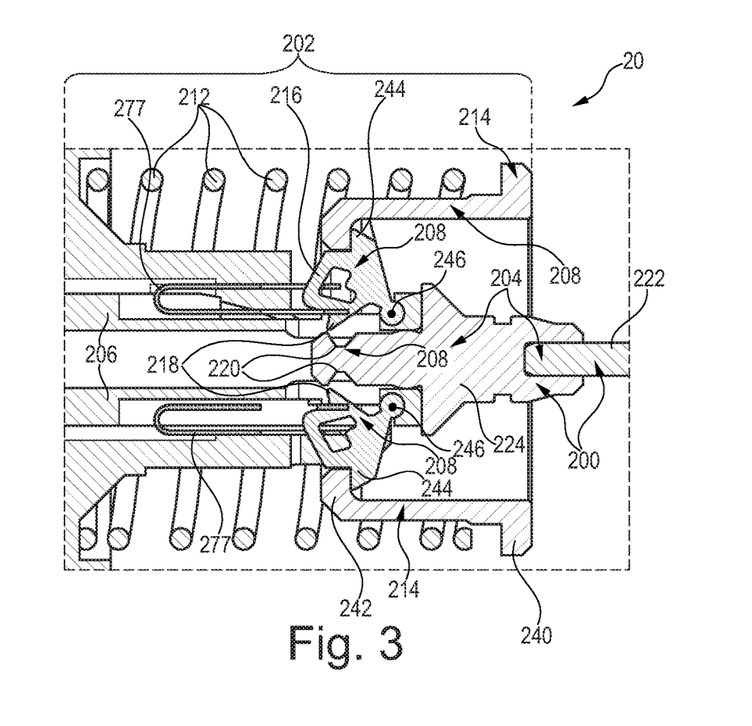
FIG. 3 illustrates a cross-sectional view of the pump according to FIG. 2 in a maintenance mode.
Figure 4:
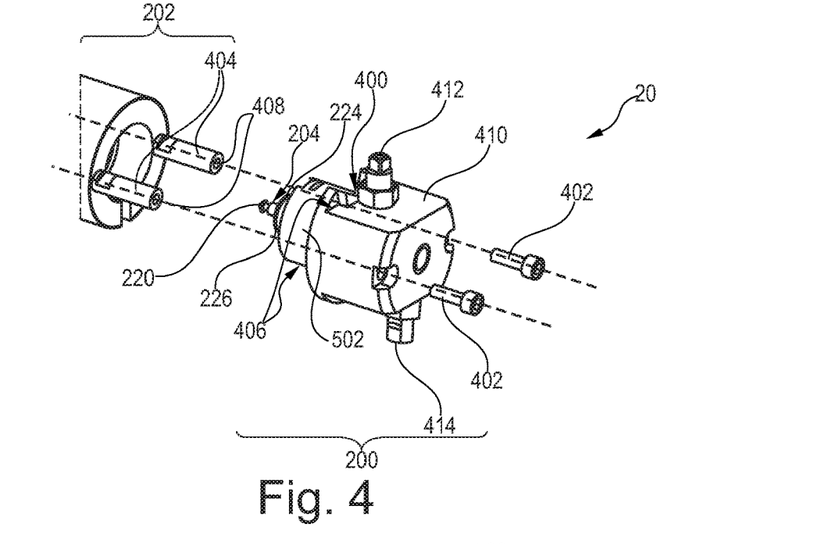
FIG. 4 shows the pump of FIG. 2 and FIG. 3 in a disassembled state.
Figure 5:
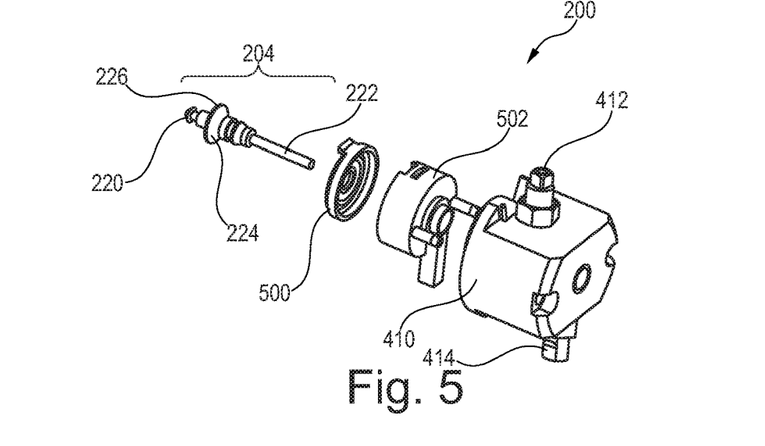
FIG. 5 shows an explosive view of components of the pump of FIG. 2 and FIG. 3.

FIG. 2 illustrates a cross-sectional view of a pump 20 according to an exemplary embodiment of the invention in a working mode, i.e. a mode in which the pump 20 is ready to pump fluid when the drive unit 22 supplies drive energy. FIG. 3 illustrates a cross-sectional view of the pump 20 according to FIG. 2 in a maintenance mode, i.e. when pump head 200 and a pump base 202 of the pump 20 are disassembled so as to allow a user to access an interior of the pump 20, in particular for repairing, maintaining or substituting a piston assembly 204. FIG. 4 shows the pump 20 of FIG. 2 and FIG. 3 in a disassembled state. FIG. 5 shows an explosive view of components of the pump 20 of FIG. 2 and FIG. 3. Hence, FIG. 2 to FIG. 5 illustrate a piston coupling architecture for a pendulum drive in a valve based High Pressure Solvent Delivery Systems in an HPLC.

The pump 20 comprises the pump head 200 comprising a working chamber 400. The pump 20 furthermore comprises a piston assembly 204 which may be assigned to the pump head 200 and may be configured for reciprocating within the working chamber 400 to thereby displace fluid. The piston assembly 204 comprises a piston 222 and a piston base 224 at which the piston 222 is mounted, wherein the piston 222 forms a free front section of the piston assembly 204 displacing the fluid in the working chamber 400 and the piston base 224 forms a rear section of the piston assembly 204 lockable to a piston actuator 206.

The pump 20 furthermore comprises the pump base 202 accommodating the piston actuator 206 being mechanically lockable to the piston assembly 204 in a working mode of the pump 20 (which is shown in FIG. 2) to thereby be coupled to enable the transmission of drive energy to the piston assembly 204 to reciprocate the piston assembly 204. The piston actuator 206 forms part of a ball screw. A ball screw is a mechanism of converting a rotational drive energy into a longitudinal motion. A motor as drive unit 22 (not shown in FIG. 2 to FIG. 5) usually rotates a shaft, i.e. provides rotational drive energy. A combination of a nut and a corresponding mandrel (or screw) on which the nut is mounted forms the above-mentioned ball screw.

As can be seen in FIG. 2, the piston assembly 204 and the piston actuator 206 are configured so that a mutual coupling surface 226, when the piston assembly 204 and piston actuator 206 are locked to one another, has an annular shape. This ensures a proper force transmission at a radially quite outside position and is tolerant against slight spatial distortions acting on the piston assembly 204 or the piston actuator 206.

A fastener 402, which is here embodied as two screws with an external thread, is configured for fastening the pump head 200 to the pump base 202 in the working mode of the pump 20. As can be taken from FIG. 4 the pump base 202 comprises two pre-positioning sockets 404 configured for being insertable in two corresponding socket receptions 406 of the pump head 200 so as to pre-position the piston assembly 204 within the pump 20 prior to the fastening by actuating the fastener 402. The pre-positioning sockets 404 comprise a fastener reception 408 (here screw holes with internal threads) configured for receiving or accommodating the fastener 402 (here the screws with external threads) to thereby fasten the pump head 200 to the pump base 202. The fastener 402 is hence configured as a screw fastener for fastening the pump head 200 to the pump base 202 by screwing the screws through the pump head 200 and the pump base 202 while simultaneously impacting a locking/unlocking mechanism 208, which will be described in the following in more detail. This fastening procedure may also form for contribute to the formation of) a mechanical lock between the piston actuator 206 and the piston assembly 204.

The locking/unlocking mechanism 208 is configured to, upon unfastening the pump head 200 from the pump base 202 by actuating the fastener 402, mechanically unlock the piston actuator 206 from the piston assembly 204 for activating the maintenance mode of the pump 20 (see FIG. 3). Furthermore, the locking/unlocking mechanism 208 is configured to, upon fastening the pump head 200 to the pump base 202 by actuating the fastener 402, contribute to a mechanical locking of the piston actuator 206 to the piston assembly 204 in the working mode of the pump 20. The locking procedure and the unlocking procedure are substantially inverse to one another and simple to be carried out by a user.

In the following, the locking/unlocking mechanism 208 will be described in further detail. It is configured so that, when the piston actuator 206 is mechanically locked to the piston assembly 204 in the working mode of the pump 20 (see FIG. 2), the piston actuator 206 is rigidly assembled with the piston assembly 204 so that the piston-actuator-assembly is arranged to commonly reciprocate along a common rigid axis 210. In other words, the piston-actuator-assembly can only move as one single rigidly coupled body in the locked state without allowing for a relative motion between piston assembly 204 and piston actuator 206. In case of spatial distortions such as vibrations, the piston-actuator-assembly behaves like a pendulum capable of performing, within limits, a compensating pivoting and translative equilibration motion.

Furthermore, the locking/unlocking mechanism 208 is configured so that, upon unfastening the pump head 200 from the pump base 202 by actuating the fastener 402, the piston assembly 204 is released from the rest of the pump 20 so as to be manually removable out of the pump head 200, in particular without using a further tool (apart from the previously used screwdriver). Thus, a user simply needs to unscrew the pump head 200 from the pump base 202 for also isolating the piston assembly 200 from all other components of the pump 20. This renders it obsolete to additionally disassemble the piston assembly 204 from the pump head 200 or the pump base 202

Such a behavior can be obtained for instance as follows. The locking/unlocking mechanism 208 comprises a biasing element 212 embodied as a helical spring which is biased, i.e. compressed and therefore under tension, in the working mode of the pump 20 as shown in FIG. 2. However, upon unfastening the pump head 200 from the pump base 202 by actuating the fastener 402, the biasing element 212 relaxes and therefore expands to thereby exert an unlocking force forcing the piston actuator 206 to be unlocked from the piston assembly 204. Correspondingly, the biasing element 212 is configured to be biased upon fastening the pump head 200 to the pump base 202 by actuating the fastener 402. When expanding while relieving, the biasing element 212 engages a right-hand side flange 240 of a movable member 214 and thereby moves the movable member 214, which is here embodied as a rotationally symmetric substantially tubular body, to the right-hand side.

As a consequence of this motion of the movable member 214 up to an abutment position on the right-hand side, a further flange 242 of the moving movable member 214 on the left-hand side actuates a first hook 244 of a lever of a lever member 216. As can furthermore be taken from FIG.

2 and FIG. 3, the lever member 216 is actually constituted by two separate levers arranged to circumferentially surround the piston actuator 206, i.e. being arranged at two opposing sides of the piston-actuator-assembly. The levers of the lever member 216 are pivotable around a pivoting axis 246 (perpendicular to the paper plane of FIG. 2), see arrow 248. The levers of the lever member 216 are actually pivoted when the further flange 242 actuates the first hook 244. The lever member 216 is mounted on the piston actuator 206 and couples the latter to the piston assembly 204. When the levers of the lever member 216 pivot as shown by arrow 248, a respective second hook (i.e., an engagement member) 218 of each of the levers of the lever member 216 disengages from a respective undercut 220 of the piston assembly 204. This unlocks the piston actuator 206 from the piston assembly 204.

As can be taken from FIG. 2 and FIG. 3, a radial position of the pivoting axis 246 (i.e. the bearing of the lever member 216) is further away from the common rigid axis 210 than a radial position of the respective undercut 220. This geometry results in a self-locking function so that the lever member 216 is locked with a further increased locking force in the presence of a mechanical load. Thus, this self-locking mechanism counteracts a release of the lock and thereby contributes to a safe and secure locking. Hence, an unlocking/locking behavior is obtained, according to which a position of the pivot point or pivoting axis 246 for the locking/unlocking mechanism 208 and the shapes of the engagement sections (i.e., the shapes of the engagement sections of second hook 218) are configured to build a self-locking kinematic for pulling forces along the common rigid axis 210, and a spring-loaded clearance compensation within the interfaces when pushing forces along the common rigid axis 210 occur.

Beyond this, two flat springs 277 (or any other kind of mechanical biasing element or elements) are provided, wherein each of the flat springs 277 is assigned to a corresponding lever member 216. More specifically, one spring leg is coupled to the respective lever member 216, whereas the respectively other spring leg is coupled to or supported by the piston actuator 206. Each of the flat springs 277 (or more generally mechanical biasing elements) is mounted to bias the respectively assigned lever member 216 radially inwardly (i.e. towards to the center of the common rigid axis 210). Hence, while the locking/unlocking mechanism 208 may force the lever member 216 to move radially outwardly for unlocking the piston assembly 204, the flat springs 277 have a counteracting tendency.

The movement of the movable member 214 towards the right hand side of FIG. 2 (which results in the piston actuator 206 being unlocked from the piston assembly 204) is triggered by the procedure of unfastening the pump head 200 from the pump base 202 by actuating the fastener 402. In other words, a user merely has to unscrew the screws constituting the fastener 402 by a screwdriver (not shown) to thereby separate the pump head 200 from the pump base 202, and the piston assembly 204 will be automatically and without any further action be disassembled from the piston actuator 206. This procedure requires the piston actuator 206 positioned in the rear back position of a working stroke which could be activated by the maintenance mode of the pump 20 and allows a user to take out the piston assembly 204 from the pump head 200 without any further unfastening procedure or further tool being necessary.

For activating the working mode (shown in FIG. 2) of the piston assembly 204 starting from the maintenance mode (shown in FIG. 3 to FIG. 5), the piston assembly 204 is only loosely inserted into the working chamber 400. The piston assembly 204 is then automatically fine positioned and locked to the piston actuator 206 via the locking/unlocking mechanism 208 by fastening the pump head 200 to the pump base 202 by actuating the fastener 402, i.e. by screwing the screws as the fastener 402 into the fastener receptions 408. It is optionally possible that the drive unit (not shown in FIG. 2 to FIG. 5), when starting to drive the piston actuator 206, completes the locking procedure.

FIG. 5 furthermore shows a sealing element 500 acting as a gas sealing and being embodied as a membrane member. FIG. 5 also shows a maintenance leakage member 502. Within a casing 410 of the pump head 200, the piston 222 reciprocates in the working mode. An inlet valve 412 and an outlet valve 414 (their function may also be interexchanged) are shown as well.

Within the working mode or regular mode shown in FIG. 2, the piston 222 of the piston assembly 204 is mechanically locked to the piston actuator 206 which is here embodied as a part of a ball screw. In the working mode, the piston assembly 204 and the piston actuator 206 act as one rigid part.

In the maintenance mode shown in FIG. 3 to FIG. 5, unscrewing of the pump head 200 will automatically unlock the piston assembly 204 from the piston actuator 206. The piston 222, the piston assembly 204 or other parts can be exchanged and the pump head 200 relocated.

Leaving the maintenance mode, the pump drive will automatically lock the piston 222 to the ball screw including the piston actuator 206 (optionally but not necessarily while moving the pre-mounted unit to the upper end of the pump head 200) and supply axial force to the interlock mechanism.

It should be noted that the term "comprising" does not exclude other elements or features and the "a" or "an" does not exclude a plurality. Also elements described in association with different embodiments may be combined. It should also be noted that reference signs in the claims shall not be construed as limiting the scope of the claims.

The invention claimed is:

1. A pump for pumping fluid, the pump comprising:
a pump base accommodating a piston actuator;
a pump head comprising a working chamber, and configured to be fastened to the pump base in a working mode of the pump and unfastened from the pump base in a maintenance mode of the pump;
a piston assembly configured for reciprocating within the working chamber to thereby displace fluid, the piston assembly being mechanically lockable to the piston actuator in the working mode to thereby enable transmission of drive energy from the piston actuator to the piston assembly to reciprocate the piston assembly, and being mechanically unlockable from the piston actuator in the maintenance mode;
a locking/unlocking mechanism configured to lock the piston actuator to the piston assembly by engaging the piston assembly, and unlock the piston actuator from the piston assembly by disengaging from the piston assembly;
a movable member separate from the piston actuator, the movable member movable between a biased position upon fastening the pump head to the pump base and an unbiased position upon unfastening the pump head from the pump base,
wherein the movable member is configured to engage the locking/unlocking mechanism, and move to the unbiased position to actuate the locking/unlocking mechanism to disengage from the piston assembly and thereby unlock the piston assembly from the piston actuator by unfastening the pump head from the pump base; and a biasing element disposed around the piston actuator and contacting the pump base and the movable member, wherein the biasing element is configured to, in response to unfastening the pump head from the pump base, exert an unlocking force on the movable member to move the movable member to the unbiased position, thereby forcing the piston actuator to be automatically unlocked from the piston assembly.

2. The pump according to claim 1, comprising a fastener being actuable for fastening the pump head to the pump base for the working mode of the pump or for unfastening the pump head from the pump base for the maintenance mode of the pump.

3. The pump according to claim 1, wherein the locking/unlocking mechanism is configured to lock the piston actuator to the piston assembly upon fastening the pump head to the pump base, in combination with an activation of the pump.

4. The pump according to claim 1, wherein the locking/unlocking mechanism is configured so that, when the piston actuator is mechanically locked to the piston assembly in the working mode of the pump, the piston actuator is assembled with the piston assembly to form a piston-actuator-assembly arranged to commonly reciprocate along a common axis.

5. The pump according to claim 1, wherein the locking/unlocking mechanism is configured so that, upon unfastening the pump head from the pump base, the piston assembly is released from the rest of the pump so as to be manually removable out of the pump.

6. The pump according to claim 1, wherein the biased biasing element is configured to upon unfastening the pump head from the pump base, expand to thereby exert the unlocking force on the movable member.

7. The pump according to claim 1, wherein the biasing element is configured to be biased upon fastening the pump head to the pump base.

8. The pump according to claim 1, wherein:
the locking/unlocking mechanism comprises a lever member coupling the piston actuator to the piston assembly at the biased position of the movable member; and
the biasing element is configured to, in response to unfastening the pump head from the pump base, move the movable member to the unbiased position to actuate the lever member to pivot, thereby unlocking the piston actuator from the piston assembly.

9. The pump according to claim 1, wherein the locking/unlocking mechanism is configured so that upon unfastening the pump head from the pump base, an engagement section of the locking/unlocking mechanism engaging an engagement section of the piston assembly is disengaged to thereby unlock the piston actuator from the piston assembly.

10. The pump according to claim 9, wherein:
the locking/unlocking mechanism comprises a lever member, and the lever member comprises the engagement section of the locking/unlocking mechanism;
the engagement section of the piston assembly comprises an undercut; and
the lever member is arranged to pivot upon unfastening the pump head from the pump base.

11. The pump according to claim 10, wherein a radial position of a pivoting axis of the lever member is further away from a common rigid axis of the piston actuator and the piston assembly than a radial position of the undercut.

12. The pump according to claim 8, wherein the lever member comprises at least two separate levers arranged to circumferentially surround the piston assembly in the working mode of the pump.

13. The pump according to claim 1, wherein one of the pump base and the pump head comprises at least one pre-positioning socket configured for being insertable in at least one corresponding socket reception of the other one of the pump base and the pump head to thereby pre-position the piston assembly within the pump prior to fastening.

14. The pump according to claim 13, wherein the at least one pre-positioning socket comprises a fastener reception configured for receiving a fastener to thereby fasten the pump head to the pump base.

15. The pump according to claim 2, wherein the fastener is selected from the group consisting of:
a screw fastener for fastening the pump head to the pump base by screwing the screw fastener through the pump head and the pump base;
a clamp lever member for fastening the pump head to the pump base by moving the clamp lever member to thereby clamp the pump head to the pump base;
a screwed joint for fastening the pump head to the pump base by screwing the pump head and the pump base together; and
a bayonet joint for fastening the pump head to the pump base by forming a bayonet connection between the pump head and the pump base.

16. The pump according to claim 1, comprising a feature selected from the group consisting of:
the piston assembly, the piston actuator and the locking/unlocking mechanism are matched so that, for activating the working mode, the piston assembly is insertable into the working chamber and is subsequently positioned and locked to the piston actuator via the locking/unlocking mechanism by fastening the pump head to the pump base, in combination with driving the piston actuator by a drive unit of the pump;
the piston assembly comprises a piston and a piston base at which the piston is mounted, wherein the piston forms a front section of the piston assembly displacing the fluid and the piston base forms a rear section of the piston assembly lockable to the piston actuator;
the piston assembly and the piston actuator are configured so that a mutual coupling surface, when being locked to one another, has an annular shape;
the piston actuator forms part of a ball screw;
the pump comprises a drive unit accommodated by the pump base for generating the drive energy for driving the piston actuator and, in turn, the piston assembly; and
the pump is configured for pumping the fluid with a pressure of at least 500 bar.

17. A fluid separation apparatus for separating a fluidic sample into a plurality of fractions, the fluid separation apparatus comprising:
the pump according to claim 1 configured for driving a fluid comprising a mobile phase and the fluidic sample in the mobile phase along a fluidic path; and
a separation unit arranged within the fluidic path and configured for separating the fluidic sample into the plurality of fractions.

18. The pump according to claim 1, wherein the movable member has a configuration selected from the group consisting of:
the movable member comprises a tubular body enclosing at least part of the piston actuator and the piston assembly, and linearly movable along a reciprocation axis of the piston assembly;

the movable member comprises a flange end configured to engage the biasing element;

the movable member comprises a flange end configured to engage the locking/unlocking mechanism.

19. The pump according to claim 1, wherein the biasing element is selected from the group consisting of: a helical spring surrounding at least a part of the movable member; and a magnetic mechanism.

20. The pump according to claim 8, comprising a spring coupled to the lever member and configured to bias the lever member radially inwardly.

* * * * *